(12) United States Patent
Au et al.

(10) Patent No.: US 9,216,827 B2
(45) Date of Patent: Dec. 22, 2015

(54) SELF-CONTAINED AIRCRAFT ELECTRONIC AIR TREATMENT SYSTEM

(71) Applicant: HONEYWELL INTERNATIONAL INC., Morristown, NJ (US)

(72) Inventors: Henry Au, West Covina, CA (US); Dennis M. Morita, Rancho Palos Verdes, CA (US); Mark Gee, South Pasadena, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 162 days.

(21) Appl. No.: 14/042,936

(22) Filed: Oct. 1, 2013

(65) Prior Publication Data

US 2015/0090119 A1    Apr. 2, 2015

(51) Int. Cl.
*B03C 3/00* (2006.01)
*B64D 13/06* (2006.01)
*B03C 9/00* (2006.01)

(52) U.S. Cl.
CPC . *B64D 13/06* (2013.01); *B03C 9/00* (2013.01); *B64D 2013/0603* (2013.01); *B64D 2013/067* (2013.01); *B64D 2013/0644* (2013.01); *B64D 2013/0662* (2013.01)

(58) Field of Classification Search
CPC .............. B03C 3/38; B03C 3/41; B03C 3/45; B03C 3/16; B03C 3/00; B03C 3/017; B03C 3/12; B03C 3/15; B03C 3/14; B03C 3/145; B03C 3/155; B01D 46/032
See application file for complete search history.

(56) References Cited

U.S. PATENT DOCUMENTS

| | | | | |
|---|---|---|---|---|
| 2,360,595 | A * | 10/1944 | Thompson | 96/61 |
| 3,440,800 | A * | 4/1969 | Messen-Jaschin | 96/52 |
| 3,526,081 | A * | 9/1970 | Kusters | 96/61 |
| 3,668,835 | A * | 6/1972 | Vicard | 96/27 |
| 4,029,485 | A * | 6/1977 | Siwersson et al. | 96/39 |
| 5,690,720 | A * | 11/1997 | Spero | 96/26 |
| 7,524,357 | B2 * | 4/2009 | Daukant | 95/69 |

FOREIGN PATENT DOCUMENTS

WO    WO2012139642    * 10/2012

* cited by examiner

*Primary Examiner* — Amber R Orlando
(74) *Attorney, Agent, or Firm* — Shimokaji IP

(57) ABSTRACT

An Environmental Control System may use an electronic air treatment system to control humidity in an aircraft. The electronic air treatment system may use an electronic charging system and a separation system. A turbine rotor may drive a power generating stage to provide high voltage power to the electronic charging system. The charging stage may charge airflow passing through to repel liquid particles away from the airflow. Liquid droplets may be collected and centrifugally flung toward a periphery of the separation system. The liquid particles may be collected outside of the airflow, which may be allowed to pass through the separation system and out to a destination in the aircraft without the collected liquid.

7 Claims, 4 Drawing Sheets

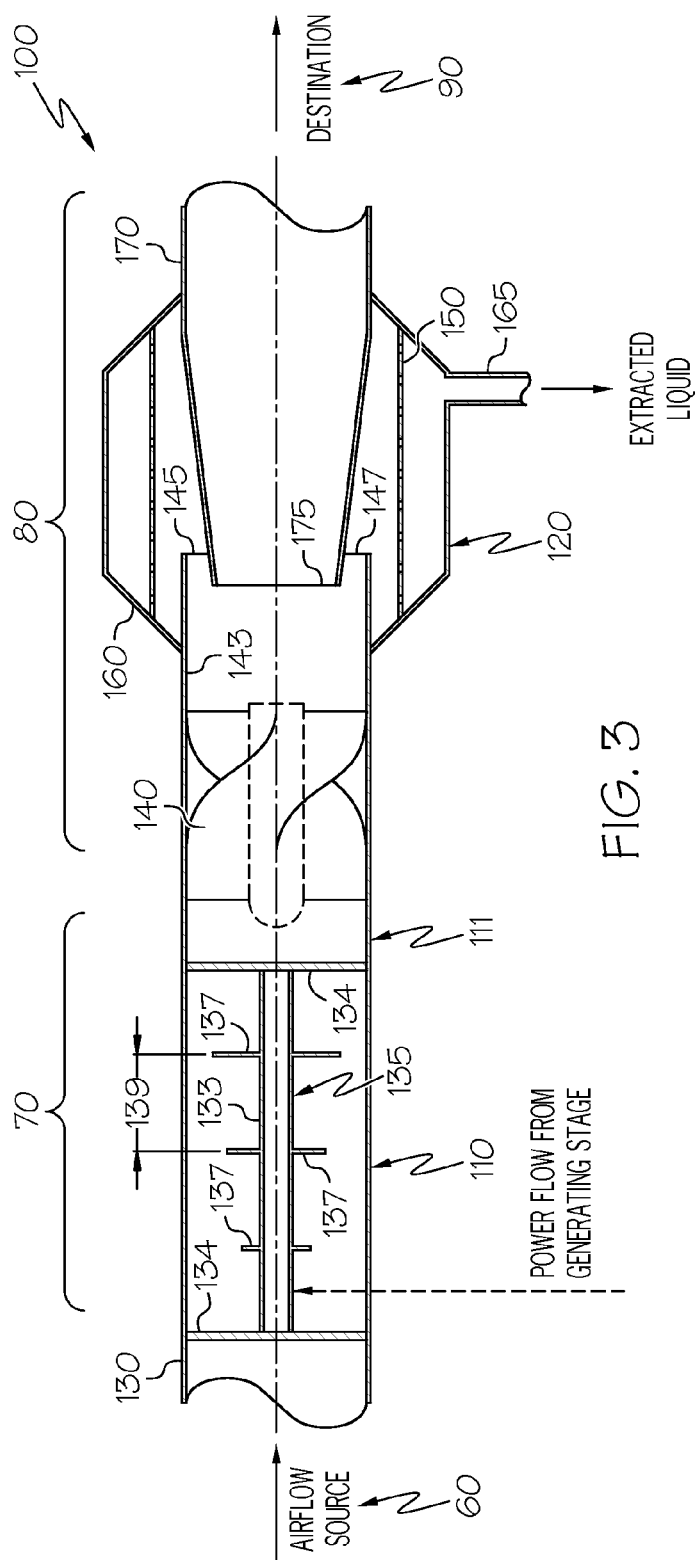
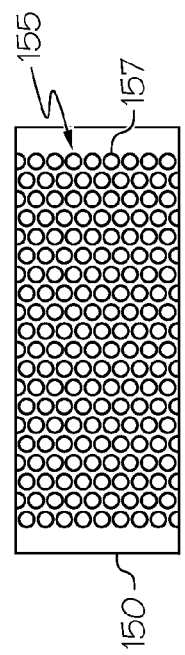
FIG. 3
FIG. 3A

SELF-CONTAINED AIRCRAFT ELECTRONIC AIR TREATMENT SYSTEM

BACKGROUND OF THE INVENTION

The present invention generally relates to apparatus and methods for powering treatment of airflows in an Environmental Control System (ECS) to remove particles using a self-contained aircraft electronic air treatment system.

ECS of various types and complexity are used in military and civil airplane, helicopter, and spacecraft applications. In aircraft for example, airflow may be circulated to occupied compartments, cargo compartments, and electronic equipment bays. Humid air containing many pollutants such as particulate matter, aerosols, and hydrocarbons may be delivered in a heated condition to the ECS. As the humid air cools, aqueous vapor condenses into liquid. The entrained moisture may be uncomfortable for passengers, unacceptable for air-cooled electronic equipment, may cause windshield fogging, and may cause corrosion to exposed metals. The ECS may include provisions to dehumidify the air supply during cooling operations to provide a comfortable environment for the passengers and crew, where particle separation may be an important function.

Some aircraft ECS operate on an air cycle refrigeration principle. Depending on the cycle architecture, particle separation may be categorized into high-pressure, mid-pressure, and low-pressure regimes. A high-pressure extractor typically removes the entrained moisture prior to expansion in the air cycle machine. A mid-pressure separation may be performed on air expanded by the high-pressure stage, but prior to expansion in the low-pressure stage in an air cycle machine with two cooling stages. A low-pressure separator typically removes the entrained moisture following expansion in the air cycle machine. In some separator systems, electronic based separators may require high voltage to charge and agglomerate the small particles present in the airflow into larger droplets. A typical electronic separator may require a dedicated high voltage source to provide sufficient voltage for charging particles.

As can be seen, there may be an ongoing need to have a self-contained electronic air treatment system without the need for an external electricity source while maintaining particles charged and liquid particle separation efficiency.

SUMMARY OF THE INVENTION

In one aspect of the present invention, an air treatment system is presented for treatment of airflow in an Environmental Control System (ECS) that comprises a power generating stage; a particle charging stage powered by the generating stage, the particle charging stage configured to electrically charge particles in an airflow; and a particle collection stage configured to collect liquid particles separated from the charged airflow.

In another aspect of the present invention, an air treatment system in an Environmental Control System (ECS) comprises an electronic generator driven by a turbine rotor; a housing configured to pass an airflow through the housing; and a charging system coupled to the electronic generator and disposed to electrically charge particles in the airflow passing through the housing.

In yet another aspect of the present invention, a method of powering particle separation system in an aircraft using an electronic air treatment system comprises generating voltage from an electronic generator; and ionizing liquid particles in an airflow using the generated voltage.

These and other features, aspects and advantages of the present invention will become better understood with reference to the following drawings, description and claims.

BRIEF DESCRIPTION OF THE DRAWINGS

FIG. 3 is a cross-sectional side view of a charging stage and a collecting stage of the electronic air treatment system of FIG. 1 according to an exemplary embodiment of the present invention;

FIG. 3A is a top sectional view of a strainer shell in the electronic air treatment system of FIG. 3.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides particle separation from airflow in an environment, such as an aircraft. Exemplary embodiments of the present invention use a particle separation system. Exemplary embodiments of the present invention may allow airflow to pass unobstructed through the separation system so that pressure may remain unchanged along the airflow path.

In environments such as aircraft, it may be desirable to consider space and weight restrictions when designing the environment's architecture. The introduction of any electronic systems may typically require a dedicated power source. More so, a particle separation system may require a high voltage power source. Exemplary embodiments of the present invention may provide a high voltage source without introducing additional power equipment to the environment.

For example, exemplary embodiments of the present invention may generally include a power generating stage through which an airflow may pass which may then be subjected to a charging stage and a collecting stage. During the charging stage, an electronic device may charge liquid particles in an airflow. In the collecting stage, liquid particles may be centrifugally moved to the periphery of the airflow where they may be collected so that the remaining airflow with less liquid content may continue to flow within the environment. In some embodiments, the features of the charging stage and/or the collecting stage may be static or fixed to their surrounding environment. By using static parts, a technician does not need to fix any moving parts or replace disposable parts, for example filters. Thus, pressure levels in embodiments of the present invention may remain substantially consistent since there are no parts that obstruct airflow (for example, a filter) which may create a difference in pressure on both sides of the filter wall through which air fluxes within the system.

Figure 1:
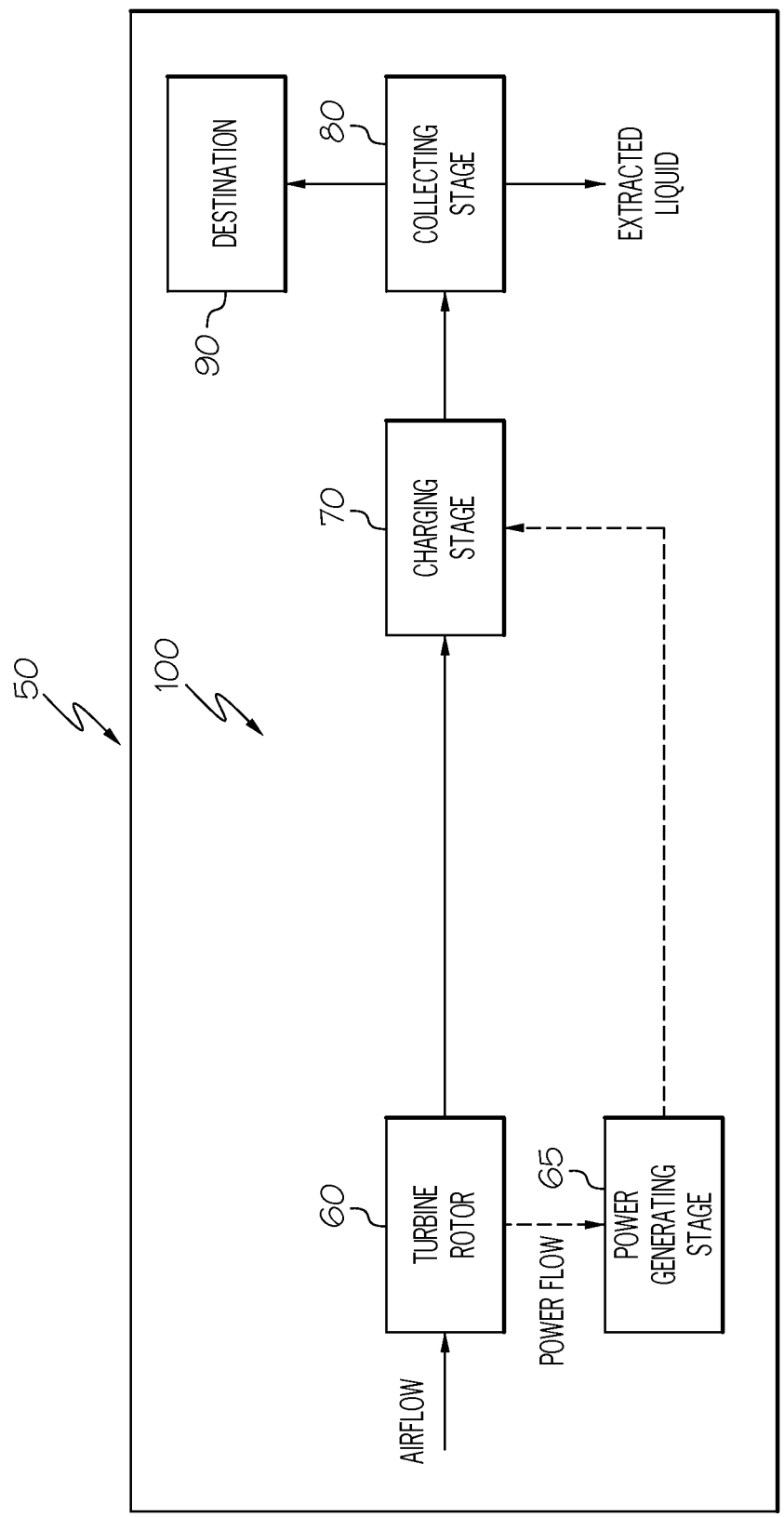
FIG. 1 is a block diagram of an Environmental Control System (ECS) having an electronic air treatment system according to an exemplary embodiment of the present invention.

Referring now to FIG. 1, an Environmental Control System 50, such as for an aircraft, can have an electronic air treatment system 100 according to an exemplary embodiment of the present invention. The electronic air treatment system 100 generally includes a power generating stage 65, a charging stage 70 and a collecting stage 80. Airflow (or airstream) from within the ECS 50 may carry liquid content providing humidity within the electronic air treatment system 100. A turbine rotor 60 may provide the airflow to the charging stage 70, which may separate liquid content from the airflow.

In the power generating stage 65, power may be provided by rotation of the turbine rotor 60. The turbine rotor 60 may be rotated by the incoming airflow to drive the power generating stage 65. The power generating stage 65 may convert power from the turbine rotor 60 into a high voltage source for the charging stage 70. In an exemplary embodiment, the turbine rotor 60 may already be present in the environment, such as on the aircraft (not shown), and used as a power source for other functions of the aircraft. Details of the power generating stage are described below with respect to FIG. 2.

During the charging stage 70, liquid particles in the airflow may be subjected to an electric charge, which may cause ionization of the particles. In some embodiments, the ionized liquid particles may attach to other ionized liquid particles producing agglomerated larger liquid droplets. The liquid droplets may be provided to the collecting stage 80. In the collecting stage 80, the liquid droplets may be centrifugally moved radially away from the airflow.

The liquid droplets may be collected away from the airflow and the airflow may be recirculated through the environment with less liquid content. In an exemplary embodiment, the airflow from the collecting stage may be provided to a destination 90 of the aircraft, for example. The destination 90 may be for example, occupied compartments, cargo compartments, or electronic equipment bays. The liquid particles collected in the collecting stage 80 may be recirculated through the ECS 50 and repurposed for use where liquid may be desirable. Details of the electronic air treatment system 100 will be described in the following.

Referring now to FIG. 2, an exemplary embodiment of the power generating stage 65 is shown in accordance with an exemplary embodiment of the present invention. The power generating stage 65 may include a generator 67 and a voltage regulator 68. The generator 67 may be an AC or DC generator. In embodiments using an AC generator, the voltage regulator 68 may include a power conditioner which may rectify/boost the voltage from the generator 67 to a DC voltage provided to the charging stage 70. In embodiments where the generator 67 is a DC generator, the voltage regulator 68 may be configured to convert the voltage into a high DC voltage for the charging stage 70. The power generating stage 65 may, in various embodiments, provide voltage in the range of 3,000-20,000 Vdc which may be sufficient to charge the particles in the airflow. In some embodiments, the generating stage 65 may be operated to regulate ozone production while maximizing particle charging. The generator 67 speed may be tracked by the amount of voltage produced. Higher generator speeds may generally produce higher voltages. The voltage output of the generating stage 65 may be regulated by limiting the mechanical speed of the generator 67 or by using electronics to control voltage output.

Referring now to FIG. 3, exemplary embodiments of the charging stage 70 and the collecting stage 80 are shown. A housing 111 may house the charging stage 70 and the collecting stage 80. An inlet duct 130 may couple the charging stage 70 to the turbine rotor 60.

In an exemplary embodiment, the charging stage 70 may include a charging system 110. The charging system 110 may include an electrode system 135 held to the housing 111 by insulation 134. The electrode system 135 may need to be isolated from the housing 111. The insulation 134 may provide electrical isolation and may center the electrode system 135 to be equally spaced within the interior of the housing 111. An electrode system 135 may be positioned to charge the airflow passing within the charging system 110. The electrode system 135 may be powered by DC voltage from the power generating stage 65. In an exemplary embodiment, the electrode system 135 may include an inner electrode 133 and one or more outer electrodes 137 attached to the inner electrode 133. The inner electrode 133 (sometimes referred to as the central electrode 133) may be, for example, a rod positioned axially and centrally along the length of the charging system 110. The outer electrode(s) 137 may be for example a disc (or other shaped plate, e.g. round, square, or hex) protruding from the inner electrode 133. The outer electrodes 137 may be of various sizes. In an exemplary embodiment, the outer electrodes 137 may be of successively increasing size as they are attached along the length of the inner electrode 133.

In operation, the inner electrode 133 may be connected to the generator 67 (FIG. 2) (the dashed arrow represents incoming power from the power generating stage 65). The housing 111 may be grounded. The high voltage conducted through the electrode system 135 may create an electric field radiating from the inner electrode 133. When the electric field intensity exceeds the maximum limit that the airflow can sustain, a corona discharge may form. Some of the energy discharged may be in the form of wavelengths of visible light. Consequently, the corona discharge in the form of a bluish light may be seen around the inner electrode 133 under some conditions. The electric field may cause the air around the electrode system 135 to ionize. During ionization, one or more of the electrons may be removed from liquid molecules in the airflow. The liquid molecules may obtain a surplus positive charge. The positive ions may be repelled from the inner electrode 133, which may be an area of powerful electrical forces. The positive ions may bombard and collide with liquid particles in the airflow and become attached. Charging the airflow may agglomerate liquid particles into larger droplets as the airflow proceeds through the charging stage 70. The repulsive force of the inner electrode 133 may generally force the ionized particles radially away from the inner electrode 133 (and thus toward the fringes of the airflow) and toward the periphery of the housing 111. Particles agglomerated by the charging stage 70 may range in size from approximately 0.05 microns to 5.0 microns.

In exemplary embodiments using outer electrodes 137 of varying size, the area between any pair of outer electrodes 137 may define a segment 139 of the electrode system 135. While a segment 139 is shown between adjacent electrodes 137, in some embodiments, non-consecutive electrodes 137 may define the segment 139. The segments 139 may vary in electric field intensity relative to any other segment 139. In embodiments that include outer electrodes 137 of progressively increasing size, for example by using discs with progressively increasing diameter, the electric field intensity may increase along the length of the electrode system 135. Increasing the electric field intensity may ionize smaller particles in the airflow and thus help agglomerate remaining finer particles that may not have agglomerated during their exposure to smaller outer electrode(s) 137. The benefits of using multiple segments of charging system 110 may include better efficiency in separating liquid particles from the airflow In an exemplary embodiment, the collecting stage 80 may include an inertial-based particle separator 120 axially aligned with the housing 111. For example, the inertial-based separator 120 may use a curved or swirl-type vane 140 fixed to the housing 111. An inner strainer shell 150 may be coupled to the downstream end 145 of the vane 140. An outlet duct 170 may be centrally aligned with the housing 111 and the airflow. An entrance end 175 of the duct 170 may be positioned inside the downstream end 145 defining a gap 147 between the housing 111 and the duct 170. The inner strainer shell 150 may surround the downstream end 145 and the entrance end 175 so that the gap 147 leads into the inner strainer shell 150. The inner strainer shell 150 may be permeable. For example, the strainer shell 150 may be a cylinder with an array 155 of small diameter, equidistantly spaced holes (FIG. 3A). The array 155 may comprise multiple rings of holes 157 arranged in a manner where the holes 157 in one row may be circumferentially offset relative to the holes 157 in the next row. The holes 157 may be sized to permit passage of the liquid particles through the strainer shell 150 while minimizing turbulent air from entering into the strainer shell 150 and liquid particles that have entered the chamber in the outer shell 160 from escaping back into the main airflow. An outer shell 160 may surround the inner shell 150. The outer shell 160 may include a drain 165 at the lowest of the outer shell 160.

In operation, liquid droplets entering the inertial-based separator 120 from the charging system 110 may encounter the vane 140 which may impart a centrifugal motion to the airflow and begin a swirling motion inside the inertial-based separator 120. The result may provide that the larger droplets (for example, heavier liquid particles) in the airflow may be moved outward by the centrifugal motion directed toward the periphery 143 of the inertial-based separator 120. Liquid droplets at the periphery 143 may pass through the gap 147 into the inner strainer shell 150. Liquid droplets in the inner strainer shell 150 may be drawn through the holes 157 by pressure into the outer shell 160 where liquid may collect and be drawn through the drain 165. Meanwhile, airflow with lower liquid content may proceed though the center of the vane 140, into the entrance end 175, into the duct 170, and onward to the destination 90.

Figure 2:
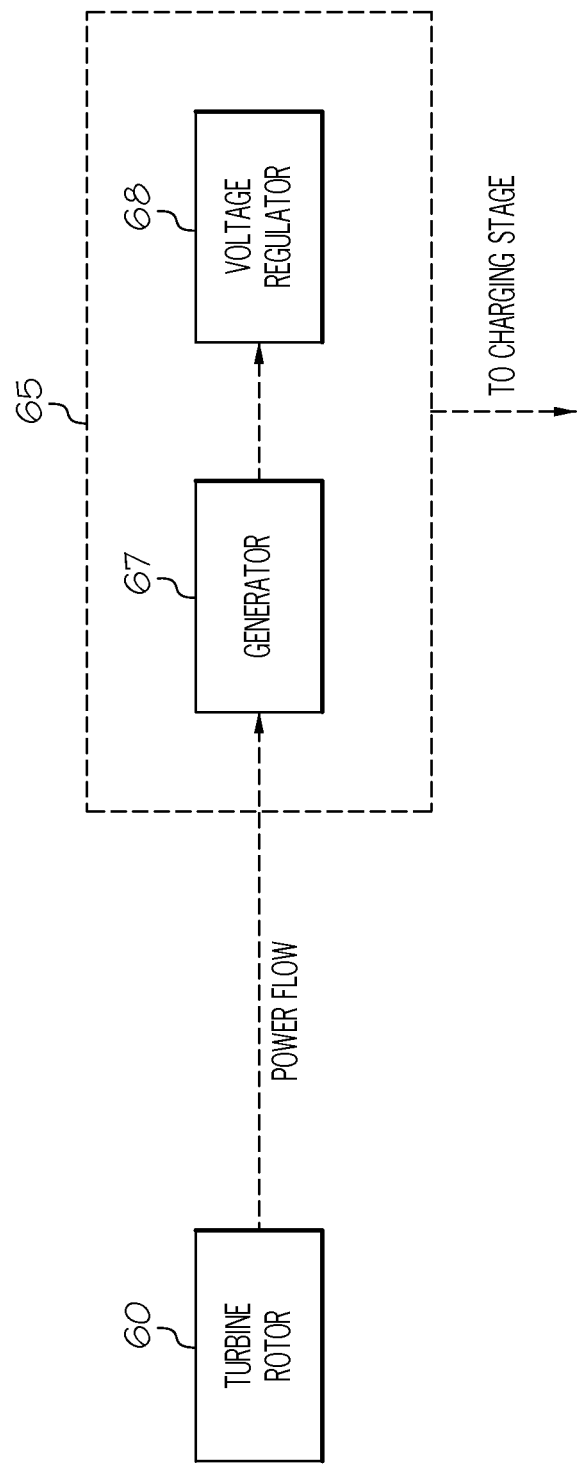
FIG. 2 is a block diagram of a power generating stage of the electronic air treatment system of FIG. 1 according to an exemplary embodiment of the present invention.
Figure 4:
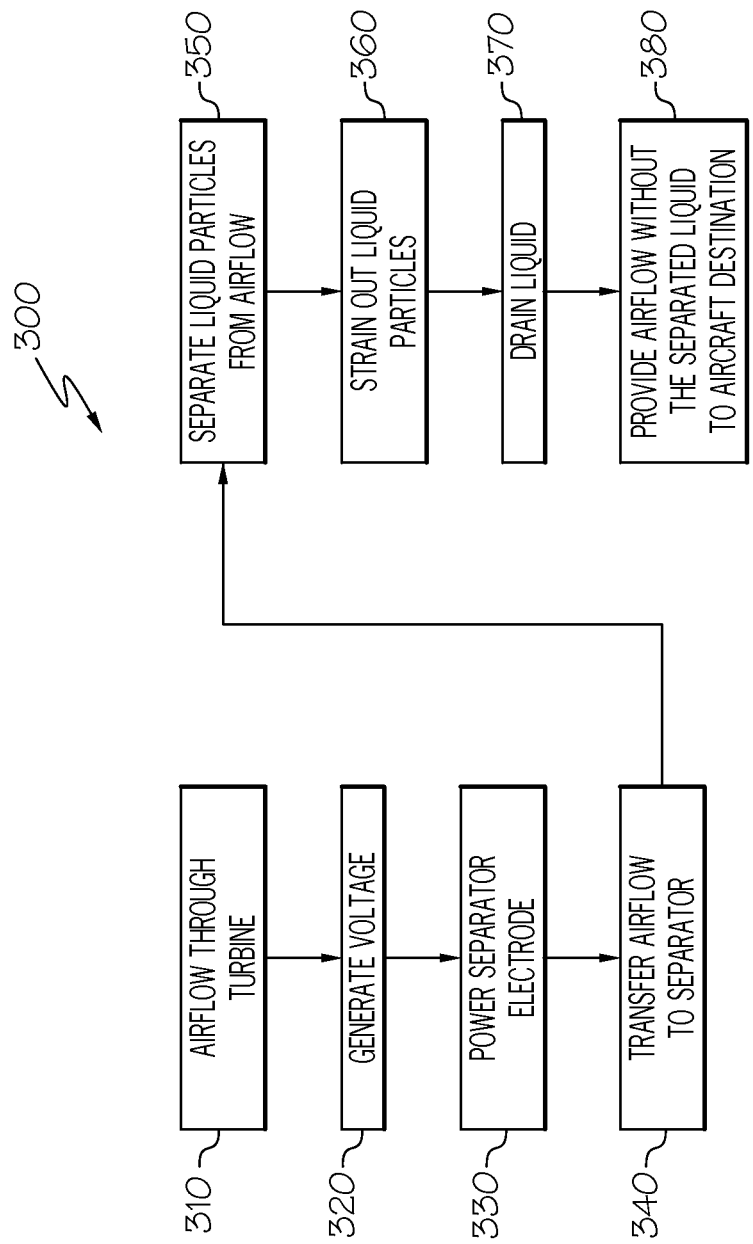
FIG. 4 is a flow chart of a method of powering particle separation system according to an exemplary embodiment of the present invention.

Referring now to FIG. 4, a method 300 of powering particle separation in an electronic air treatment system, for example, the electronic air treatment system 100 shown in FIG. 2, is shown according to an exemplary embodiment of the present invention. In block 310, an airflow containing liquid particles may be provided from a source in an ECS, through a turbine rotor and onto a charging system. In block 320, the turbine rotor may drive a generator. In block 330, the generator may provide a high voltage power source to an electrode configured to ionize liquid droplets liquid droplets in a charging system. In block 340, the ionized liquid droplets may be transferred to an inertial-based separator. In block 350, the ionized liquid droplets may be separated from the airflow by the separator. For example, the ionized liquid droplets may be centrifugally directed by a vane to the periphery of the separator. In block 360, the collected liquid particles may be strained out of the airflow by a strainer shell. In block 370, the strained liquid particles may be drained from an outer shell. In block 380, the airflow, without the collected liquid particles, may be provided to a destination in the aircraft.

It should be understood, of course, that the foregoing relates to exemplary embodiments of the invention and that modifications may be made without departing from the spirit and scope of the invention as set forth in the following claims.

We claim:

1. An electronic air treatment system in an Environmental Control System (ECS), comprising:
   a power generating stage;
   a particle charging stage powered by the power generating stage, the particle charging stage configured to electrically charge liquid particles in an airflow, the particle charging stage including;
      an inner electrode;
      a first outer electrode on the inner electrode, wherein the first outer electrode has a first size;
      a second outer electrode on the inner electrode, wherein the second outer electrode has a second size different from the first size;
      a third outer electrode on the inner electrode, wherein third outer electrode has a third size different from the first size and the second size;
      a first segment formed between the first outer electrode and the second outer electrode, and
      a second segment formed between the second outer electrode and the third outer electrode; and
   a particle collection stage configured to collect liquid particles separated from the charged airflow.

2. The electronic air treatment system of claim 1, wherein the power generating stage is driven by a turbine rotor of an aircraft.

3. The electronic air treatment system of claim 2, wherein the airflow rotates the turbine rotor.

4. The electronic air treatment system of claim 2, wherein the turbine rotor is configured to provide the airflow to the particle charging stage.

5. The electronic air treatment system of claim 1, wherein the power generating stage is configured to provide a voltage level to the particle charging stage sufficient to ionize liquid particles in the airflow.

6. The electronic air treatment system of claim 5, wherein the particle charging stage is configured to agglomerate the ionized liquid particles as the airflow progresses through the particle charger.

7. The electronic air treatment system of claim 5, wherein the voltage level is sufficient to move the charged liquid particles radially away from the airflow.

* * * * *